US012672991B2

(12) United States Patent
Hu

(10) Patent No.: US 12,672,991 B2
(45) Date of Patent: Jul. 7, 2026

(54) HANDLE FOLDING STRUCTURE OF WHEELCHAIR

(71) Applicant: ZHEJIANG HFIZER MEDICAL EQUIPMENT CO., LTD., Jinhua (CN)

(72) Inventor: Xiaoneng Hu, Jinhua (CN)

(73) Assignee: ZHEJIANG HFIZER MEDICAL EQUIPMENT CO., LTD., Jinhua (CN)

( * ) Notice: Subject to any disclaimer, the term of this patent is extended or adjusted under 35 U.S.C. 154(b) by 276 days.

(21) Appl. No.: 18/655,481

(22) Filed: May 6, 2024

(65) Prior Publication Data

US 2025/0318969 A1 Oct. 16, 2025

(30) Foreign Application Priority Data

Apr. 15, 2024 (CN) ......................... 202420784519.2

(51) Int. Cl.
*A61G 5/10* (2006.01)

(52) U.S. Cl.
CPC ..................................... *A61G 5/10* (2013.01)

(58) Field of Classification Search
CPC ........................................................ A61G 5/10
See application file for complete search history.

(56) References Cited

U.S. PATENT DOCUMENTS 4,164,354 A * 8/1979 Rodaway ................. A61G 5/08 280/42
4,375,295 A * 3/1983 Volin ..................... A61G 5/128 160/DIG. 15
7,052,023 B2 * 5/2006 Chen .................... A61G 5/1086 280/47.38
9,375,370 B2 * 6/2016 Horacek .............. A61G 5/1054
9,592,169 B2 * 3/2017 Eddy ...................... A61G 5/125
D1,024,857 S * 4/2024 Hu ............................... D12/131
2025/0318969 A1 * 10/2025 Hu ......................... A61G 5/085

FOREIGN PATENT DOCUMENTS

CN 219782988 U * 10/2023
GB 2421009 A * 6/2006 ........... A61G 5/0825
GB 2458168 A * 9/2009 ............. A61G 5/128
GB 2458169 A * 9/2009 ............. A61G 5/128
JP 3164650 U * 12/2010
RU 237403 U1 * 9/2025
WO WO-2015034372 A1 * 3/2015 ............. A61G 5/128

* cited by examiner

*Primary Examiner* — Jacob B Meyer
(74) *Attorney, Agent, or Firm* — HOWARD M COHN and Associates, LLC

(57) ABSTRACT

The present disclosure relates to the field of wheelchair equipment, and more particularly relates to a handle folding structure of a wheelchair, including a backrest rod and a handle bar, where the handle bar is provided with a handle portion and includes a horizontal section and a vertical section which are connected to each other; the horizontal section is bent and extends backwards relative to the vertical section, and an end portion of the vertical section is rotatably connected to the backrest rod and forms a rotation axis; the backrest rod and the vertical section are jointly provided with a locking device; an end of the rotation axis close to an inner side of the wheelchair is tilted towards a front side of the wheelchair; and the handle bar can be switched between unfolded and folded states relative to the backrest rod.

6 Claims, 7 Drawing Sheets

HANDLE FOLDING STRUCTURE OF WHEELCHAIR

TECHNICAL FIELD

The present disclosure relates to the field of wheelchair equipment, and more particularly relates to a handle folding structure of a wheelchair.

BACKGROUND

Wheelchairs are a means of transportation often used by people with disabilities or the elderly and infirm. However, the wheelchairs are larger in overall volume and relatively heavy, making the carrying and transportation of them become the primary challenge for the above-mentioned people who need to travel long distances.

Folding wheelchairs have now appeared on the market to improve the convenience of wheelchair transportation. The wheelchair usually includes backrest rods and bent handle bars, where each of the handle bars includes a horizontal section and a vertical section. According to the folding wheelchair, the backrest rods and the handle bars can be folded. However, after the handle bars are folded backward relative to the backrest rods, end portions of the horizontal sections will abut against the backrest rods, resulting in larger angles between the vertical sections and the backrest rods when the handle bars are folded to their limiting positions. The space volume occupied by the folded handle bars is larger, so that the folding effect is poor.

SUMMARY

In order to solve the above problems, the present disclosure provides a handle folding structure of a wheelchair so as to solve the problem that the poor folding effect of handle bar leads to a large overall volume of the wheelchair after overall folding.

The technical solution adopted by the present disclosure is as follows: a handle folding structure of a wheelchair includes a backrest rod and a handle bar, where the handle bar is provided with a handle portion; the handle bar includes a horizontal section and a vertical section which are connected to each other; the horizontal section is bent and extends backwards relative to the vertical section, an end portion of the vertical section is rotatably connected to the backrest rod and forms a rotation axis, the backrest rod and the vertical section are jointly provided with a locking device, and an end of the rotation axis close to an inner side of the wheelchair is tilted towards a front side of the wheelchair; the handle bar can be switched between unfolded and folded states relative to the backrest rod; and when the handle bar is in the folded state, the horizontal section is located at an outer side of the backrest rod.

By adopting the above technical solution, due to the inclination of the inner side end of the rotation axis towards the front side of the wheelchair, an end portion of the horizontal section of the handle bar does not directly abut against the backrest rod during the folding process. The vertical section can be further folded to reduce the angle between the backrest rod and the vertical section, resulting in a smaller space volume occupied by the handle bar part after the wheelchair is fully folded, so that a better folding effect is achieved.

Further, the backrest rod is in a straight section shape as a whole, a central axis is formed along an axial direction of the backrest rod, and the central axis is perpendicular to the rotation axis.

By adopting the above technical solution, the backrest rod and the vertical section are always in the same spatial plane during the relative rotation process, so that when the backrest rod is in a folded state, the angle between the backrest rod and the vertical section is smaller; and therefore, the space volume occupied by the handle bar in the folded state is further reduced, making the folding effect better.

Further, an inclination angle of the end of the rotation axis close to the inner side of the wheelchair towards the front ranges from 12 degrees to 20 degrees.

By adopting the above technical solution, the inclination angle of the rotation axis is enabled to be within a reasonable range, which not only ensures that the end portion of the horizontal section will not directly abut against the backrest rod in the process of folding the handle bar, but also prevents the handle bar in the folded state from excessively tilting outwards.

Further, the vertical section includes a first connecting seat, the backrest rod includes a second connecting seat, and the first connecting seat and the second connecting seat are rotatably connected to each other; the locking device includes an installation channel, a movable column, an adjustable wrench, and an elastic element, where the installation channel is arranged on the first connecting seat, the movable column is installed inside the installation channel, the movable column is provided with a positioning surface, a positioning plate is arranged inside the installation channel, the elastic element is abutted between the positioning surface and the positioning plate, the movable column is provided with a limiting plate extending to the side, an avoidance hole is formed on the adjustable wrench for the movable column to pass through, and the adjustable wrench is located between the first connecting seat and the limiting plate; and a side wall of the second connecting seat is connected to a clamping hole into which the movable column can be inserted.

By adopting the above technical solution, a user pulls the adjustable wrench to make an end portion of the movable column exit the clamping hole, and then turns the handle bar backward and downward to fold the handle bar. The user can enable the handle bar to be unfolded by simply turning the handle bar upward and forward until the end portion of the movable column is clamped into the clamping hole, thereby achieving the switching of the unfolded state of the handle bar. The user can adjust the handle bar to the unfolded state or the folded state by a simple operation, so that the present disclosure is very convenient to use.

Further, the movable column includes a screw and a nut, and the screw and the nut are in threaded connection with each other; the positioning surface is arranged on the screw; and the limiting plate is arranged on the nut.

By adopting the above technical solution, the structure of the movable column is simple, and installation can be completed by threading the screw into the installation channel and the avoidance hole and connecting same to the nut. The movable column is convenient to install, facilitating assembly and production.

Further, a clamping groove is formed on a side surface of the adjustable wrench facing away from the clamping hole, two abutting surfaces facing the opposite directions are arranged on a side surface of the limiting plate, the abutting surfaces are tightly adhered to two opposite inner walls in the clamping groove, and the nut is fixed in a circumferential direction.

By adopting the above technical solution, relative rotation between the adjustable wrench and the movable column is avoided during use, thereby avoiding excessive rotation or even detachment of the screw and the nut due to vibration generated during use, and further avoiding inconvenience in use.

BRIEF DESCRIPTION OF FIGURES

In order to more clearly illustrate the embodiments of the present disclosure or the technical solutions in the prior art, a brief introduction will be given below to the accompanying drawings required in the description of the embodiments or prior art. Obviously, the accompanying drawings in the following description are only some embodiments of the present disclosure, and for those of ordinary skill in the art, other accompanying drawings may also be obtained based on the structures shown in these drawings without any creative labor.

Figure 1:
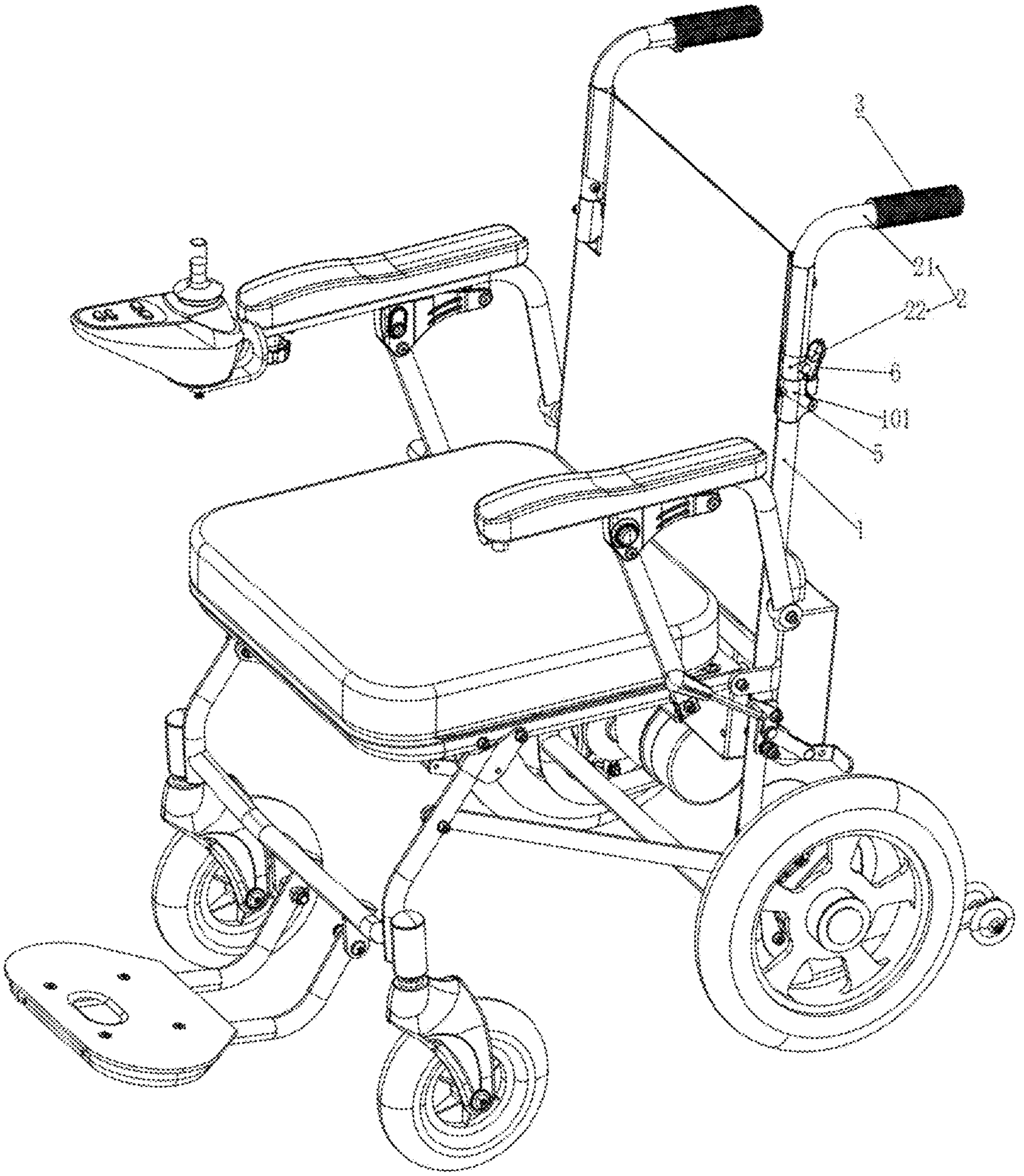
FIG. 1 is a schematic diagram of the overall structure in an unfolded state.

The reference numerals involved in the present disclosure are as follows:

1 denotes a backrest rod; 2 denotes a handle bar; 3 denotes a handle portion; 4 denotes an installation channel; 5 denotes a movable column; 6 denotes an adjustable wrench; 7 denotes an elastic element; 8 denotes a positioning surface; 9 denotes a positioning plate; 10 denotes a limiting plate; 11 denotes an avoidance hole; 12 denotes a clamping hole; 13 denotes a clamping groove; 14 denotes abutting surfaces; 21 denotes a horizontal section; 22 denotes a vertical section; 221 denotes a first connecting seat; 101 denotes a second connecting seat; 51 denotes a screw; 52 denotes a nut; 100 denotes a central axis; and 200 denotes a rotation axis.

The implementation, functional characteristics, and advantages of the present disclosure will be further explained with reference to the accompanying drawings in conjunction with the embodiments.

DETAILED DESCRIPTION

The technical solutions in the embodiments of the present disclosure will be described clearly and completely hereinafter with reference to the accompanying drawings in the embodiments of the present disclosure. Apparently, the described embodiments are only a part rather than all of the embodiments of the present disclosure. Based on the embodiments of the present disclosure, all other embodiments obtained by those of ordinary skill in the art without making creative efforts shall fall within the protection scope of the present disclosure.

It should be noted that all directional indications (such as upper, lower, left, right, front, back . . . ) in the embodiments of the present disclosure are only used to explain a relative position relationship and motion situation between components in a specific posture (as shown in the figure). If the specific posture changes, the directional indication also changes accordingly.

In addition, the descriptions such as "first" and "second" involved in the present disclosure are only for the purpose of description, and cannot be understood as indicating or implying their relative importance or implicitly indicating the number of indicated technical features. Thus, the features defined with "first" and "second" may explicitly or implicitly include at least one of these features. Moreover, the technical solutions of the various embodiments may be combined with each other, but only on the basis that they can be implemented by those of ordinary skill in the art. When the combination of the technical solutions is contradictory or impossible to achieve, it should be considered that the combination of such technical solutions does not exist and is not within the protection scope of the present disclosure.

Referring to FIG. 1, FIG. 2, FIG. 6, and FIG. 7, a handle folding structure of a wheelchair includes a backrest rod 1 and a handle bar 2, where the handle bar 2 is provided with a handle portion 3; the handle bar 2 includes a horizontal section 21 and a vertical section 22 which are connected to each other; the horizontal section 21 is bent and extends backwards relative to the vertical section 22, an end portion of the vertical section 22 is rotatably connected to the backrest rod 1 and forms a rotation axis 200, the backrest rod 1 and the vertical section 22 are jointly provided with a locking device, and an end of the rotation axis 200 close to an inner side of the wheelchair is tilted towards a front side of the wheelchair; the handle bar 2 can be switched between unfolded and folded states relative to the backrest rod 1; and when the handle bar 2 is in the folded state, the horizontal section 21 is located at an outer side of the backrest rod 1.

Due to the inclination of the inner side end of the rotation axis 200 towards the front side of the wheelchair, an end portion of the horizontal section 21 of the handle bar 2 does not directly abut against the backrest rod 1 during the folding process. The vertical section 22 can be further folded to reduce the angle between the backrest rod 1 and the vertical section 22, resulting in a smaller space volume occupied by the part of the handle bar 2 after the wheelchair is fully folded, so that a better folding effect is achieved.

Figure 3:
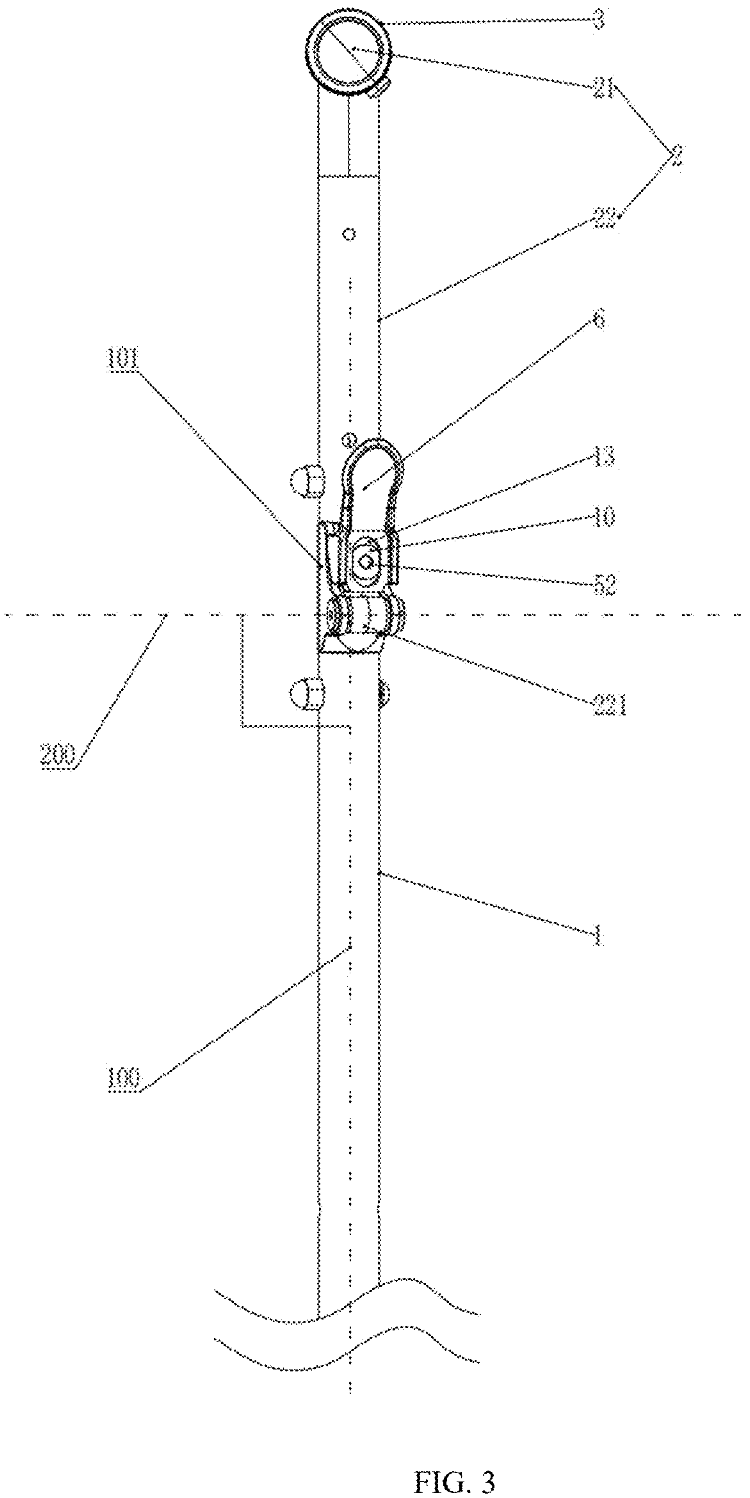
FIG. 3 is a schematic diagram of the partial structure in the unfolded state.

Referring to FIG. 3, the backrest rod 1 is in a straight section shape as a whole, a central axis 100 is formed along an axial direction of the backrest rod 1, and the central axis 100 is perpendicular to the rotation axis 200.

The backrest rod 1 and the vertical section 22 are always in the same spatial plane during the relative rotation process, so that when the backrest rod 1 is in a folded state, the angle between the backrest rod 1 and the vertical section 22 is smaller; and therefore, the space volume occupied by the handle bar 2 in the folded state is further reduced, making the folding effect better.

When a user operates the handle bar 2, the handle bar 2 rotates around the rotation axis 200. Herein, the rotation axis 200 and the central axis 100 are used to assist in illustrating the specific orientation of the rotational connecting part between the backrest rod 1 and the handle bar 2 in a three-dimensional space, and the rotation axis 200 and the central axis 100 are only for reference and do not actually exist.

Figure 6:
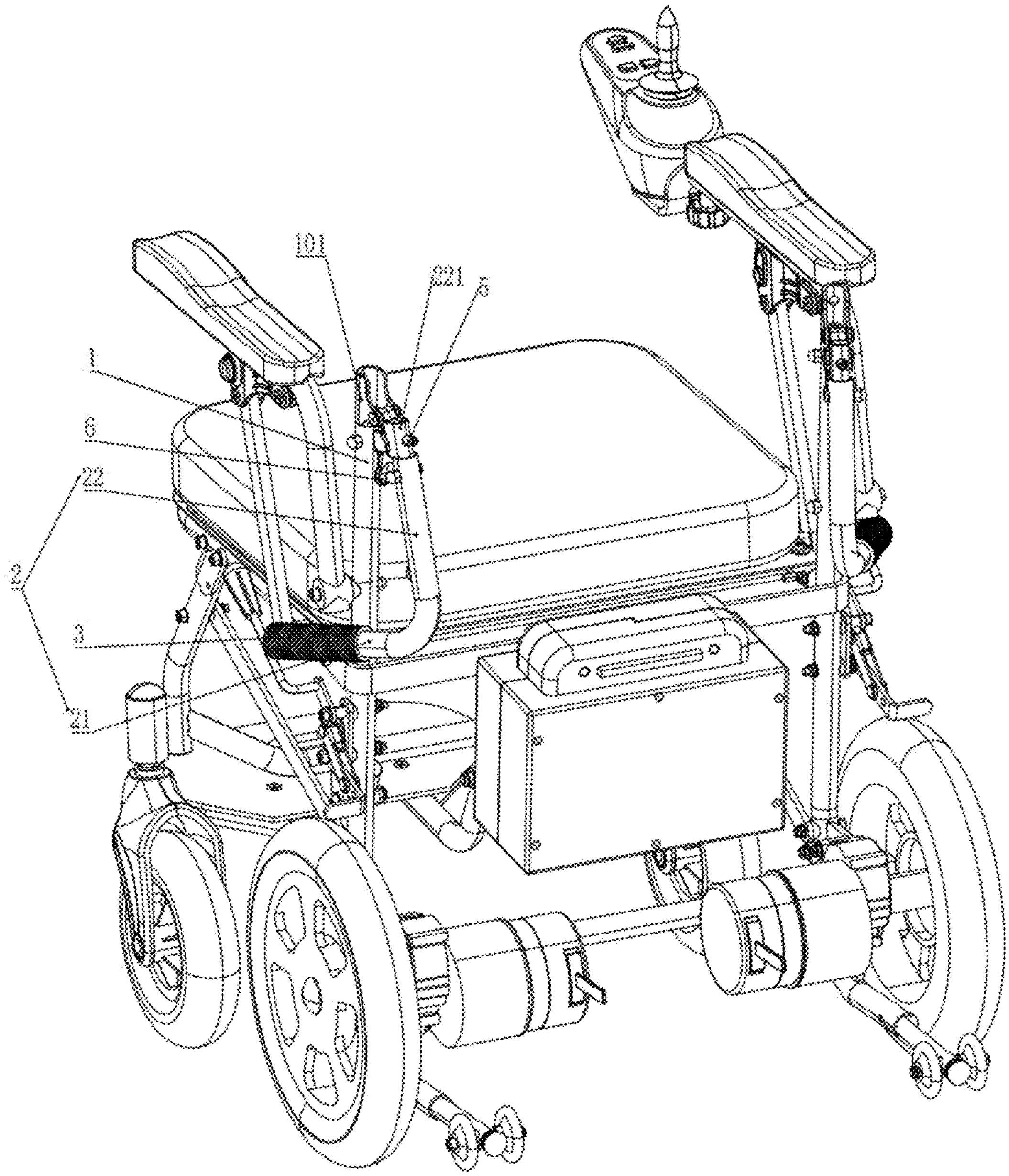
FIG. 6 is a schematic diagram of the overall structure in a folded state.
Figure 7:
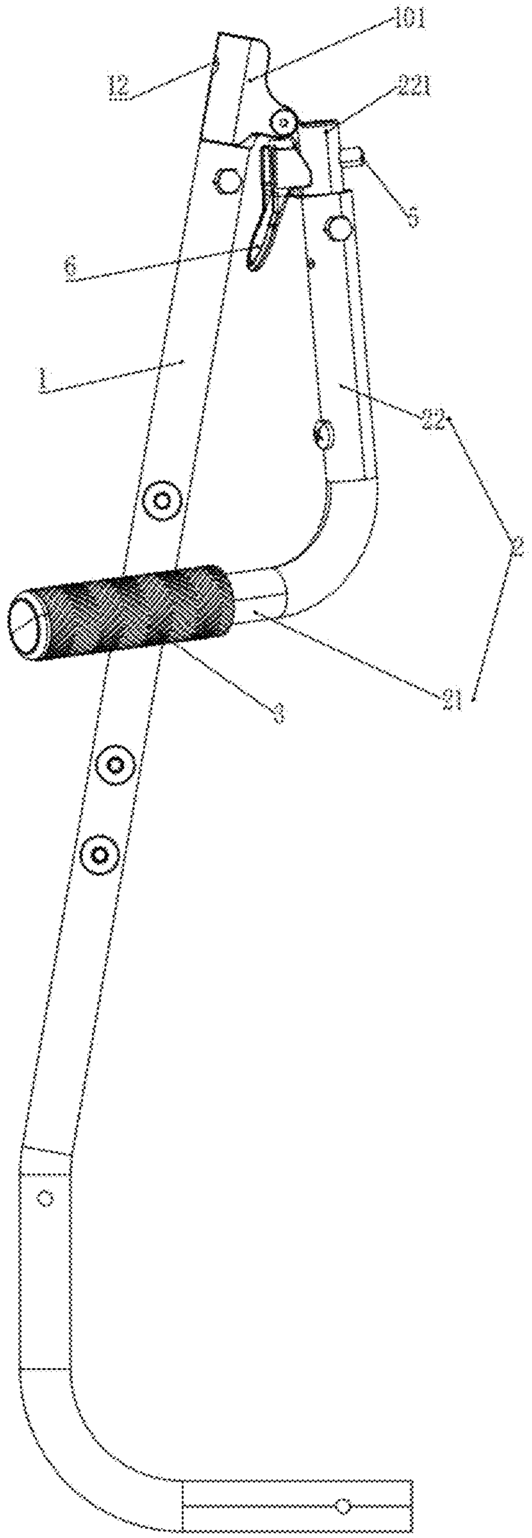
FIG. 7 is a schematic diagram of the partial structure in the folded state.

FIG. 6 is a reference diagram of an overall state in which only the backrest rod 1 and the handle bar 2 are in a folded state, and does not mean that other parts of the wheelchair cannot be folded.

Figure 2:
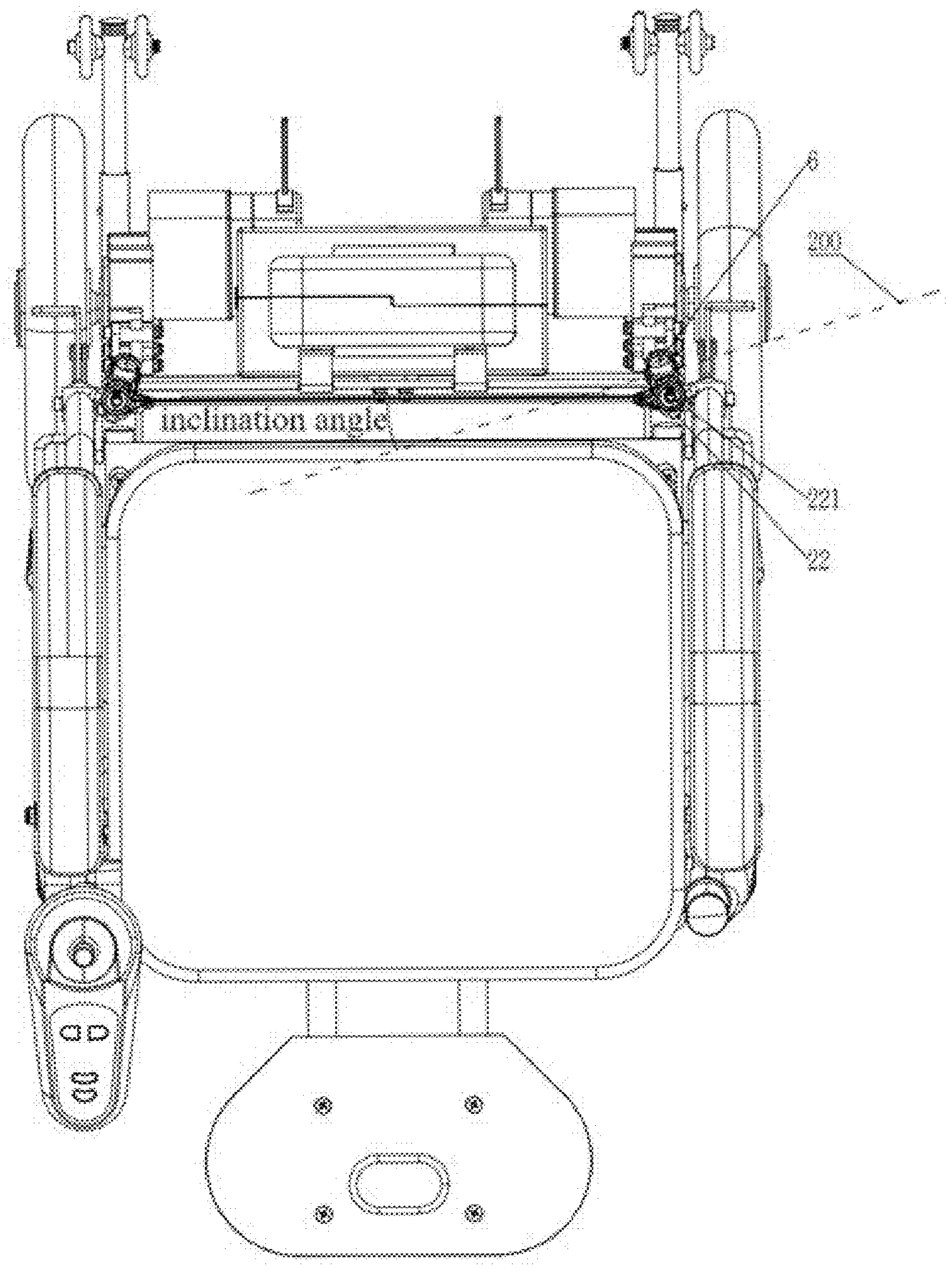
FIG. 2 is a sectional view I in the unfolded state.

Referring to FIG. 2, an inclination angle of the end of the rotation axis 200 close to the inner side of the wheelchair towards the front ranges from 12 degrees to 20 degrees.

The inclination angle of the rotation axis 200 is enabled to be within a reasonable range, which not only ensures that the end portion of the horizontal section 21 will not directly abut against the backrest rod 1 in the process of folding the handle bar 2, but also prevents the handle bar 2 in the folded state from excessively tilting outwards.

Preferably, the inclination angle of the end of the rotation axis 200 close to the inner side of the wheelchair towards the front is 16 degrees.

Referring to FIG. 3, FIG. 4, FIG. 5, FIG. 6, and FIG. 7, the vertical section 22 includes a first connecting seat 221, the backrest rod 1 includes a second connecting seat 101, and the first connecting seat 221 and the second connecting seat 101 are rotatably connected to each other; the locking device includes an installation channel 4, a movable column 5, an adjustable wrench 6, and an elastic element 7, where the installation channel 4 is arranged on the first connecting seat 221, the movable column 5 is installed inside the installation channel 4, the movable column 5 is provided with a positioning surface 8, a positioning plate 9 is arranged inside the installation channel 4, the elastic element 7 is abutted between the positioning surface 8 and the positioning plate 9, the movable column 5 is provided with a limiting plate 10 extending to the side, an avoidance hole 11 is formed on the adjustable wrench 6 for the movable column 5 to pass through, and the adjustable wrench 6 is located between the first connecting seat 221 and the limiting plate 10; and a side wall of the second connecting seat 101 is connected to a clamping hole 12 into which the movable column 5 can be inserted.

The user pulls the adjustable wrench 6 to make an end portion of the movable column 5 exit the clamping hole 12, and then turns the handle bar 2 backward and downward to fold the handle bar 2. The user can enable the handle bar 2 to be unfolded by simply turning the handle bar 2 upward and forward until the end portion of the movable column 5 is clamped into the clamping hole 12, thereby achieving the switching of the unfolded state of the handle bar 2. The user can adjust the handle bar 2 to the unfolded state or the folded state by a simple operation, so that the present disclosure is very convenient to use.

The elastic element 7 is a spring sleeved outside the movable column 5.

Figure 4:
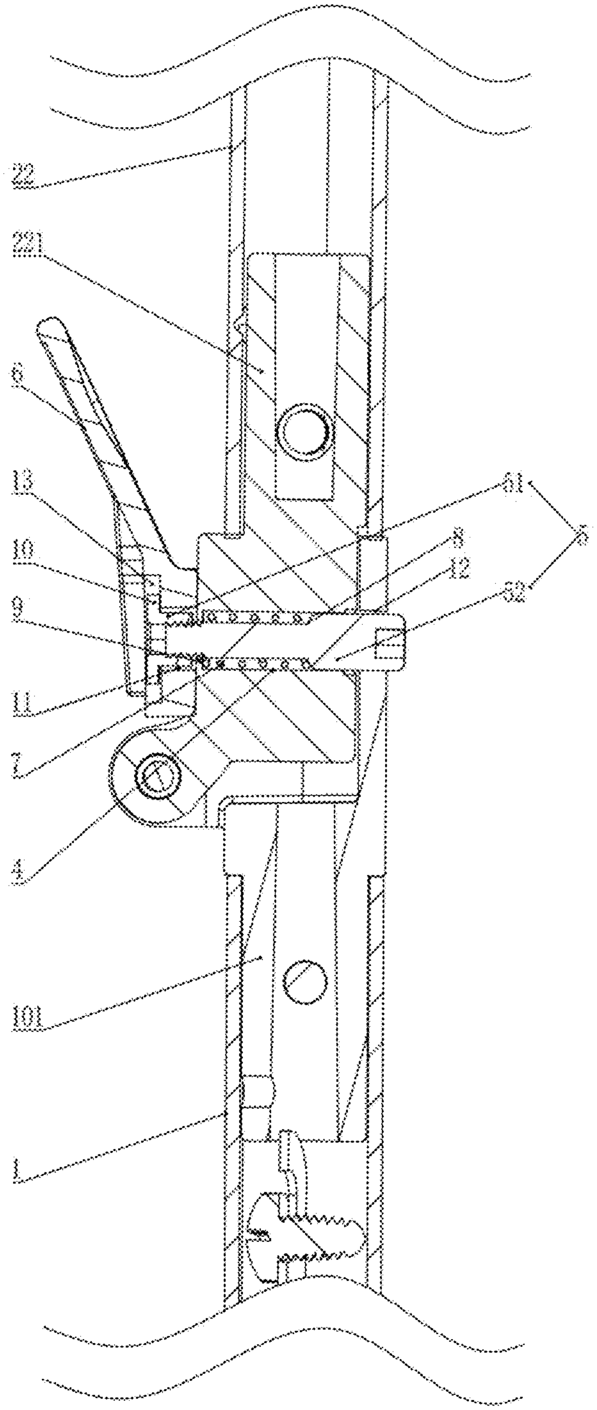
FIG. 4 is a sectional view II in the unfolded state.
Figure 5:
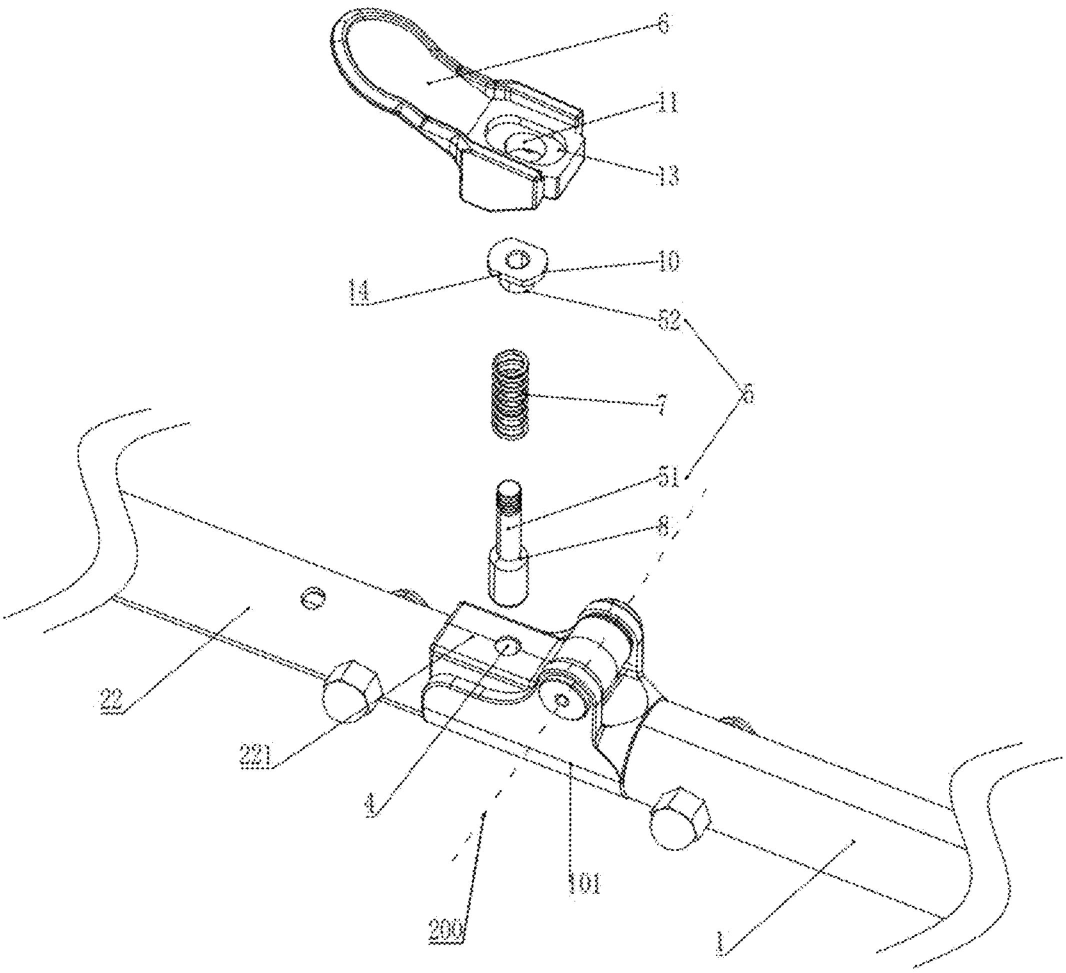
FIG. 5 is an exploded view of the present disclosure.

Referring to FIG. 4 and FIG. 5, the movable column 5 includes a screw 51 and a nut 52, and the screw 51 and the nut 52 are in threaded connection with each other; the positioning surface 8 is arranged on the screw 51; and the limiting plate 10 is arranged on the nut 52.

The structure of the movable column 5 is simple, and installation can be completed by threading the screw 51 into the installation channel 4 and the avoidance hole 11 and connecting same to the nut 52. The movable column 5 is convenient to install, facilitating assembly and production.

Referring to FIG. 3 and FIG. 5, a clamping groove 13 is formed on a side surface of the adjustable wrench 6 facing away from the clamping hole 12, two abutting surfaces 14 facing the opposite directions are arranged on a side surface of the limiting plate 10, the abutting surfaces 14 are tightly adhered to two opposite inner walls in the clamping groove 13, and the nut 52 is fixed in a circumferential direction.

Relative rotation between the adjustable wrench 6 and the movable column 5 is avoided during use, thereby avoiding excessive rotation or even detachment of the screw 51 and the nut 52 due to vibration generated during use, and further avoiding inconvenience in use.

The foregoing descriptions are merely exemplary embodiment of the present disclosure, and are not intended to limit the patent scope of the present disclosure. Under the inventive concept of the present disclosure, any equivalent structural changes made by using the contents of the Description and Drawings of the present disclosure, or direct/indirect applications in other related technical fields are included in the patent protection scope of the present disclosure.

What is claimed is:

1. A handle folding structure of a wheelchair, comprising a backrest rod (1) and a handle bar (2), wherein the handle bar (2) is provided with a handle portion (3); the handle bar (2) comprises a horizontal section (21) and a vertical section (22) which are connected to each other; the horizontal section (21) is bent and extends backwards relative to the vertical section (22), an end portion of the vertical section (22) is rotatably connected to the backrest rod (1) and forms a rotation axis (200), and the backrest rod (1) and the vertical section (22) are jointly provided with a locking device, wherein an end of the rotation axis (200) close to an inner side of the wheelchair is tilted towards a front side of the wheelchair; the handle bar (2) can be switched between unfolded and folded states relative to the backrest rod (1); and when the handle bar (2) is in the folded state, the horizontal section (21) is located at an outer side of the backrest rod (1).

2. The handle folding structure of the wheelchair according to claim 1, wherein the backrest rod (1) is in a straight section shape as a whole, a central axis (100) is formed along an axial direction of the backrest rod (1), and the central axis (100) is perpendicular to the rotation axis (200).

3. The handle folding structure of the wheelchair according to claim 2, wherein an inclination angle of the end of the rotation axis (200) close to the inner side of the wheelchair towards the front ranges from 12 degrees to 20 degrees.

4. The handle folding structure of the wheelchair according to claim 3, wherein the vertical section (22) comprises a first connecting seat (221), the backrest rod (1) comprises a second connecting seat (101), and the first connecting seat (221) and the second connecting seat (101) are rotatably connected to each other; the locking device comprises an installation channel (4), a movable column (5), an adjustable wrench (6), and an elastic element (7), wherein the installation channel (4) is arranged on the first connecting seat (221), the movable column (5) is installed inside the installation channel (4), the movable column (5) is provided with a positioning surface (8), a positioning plate (9) is arranged inside the installation channel (4), the elastic element (7) is abutted between the positioning surface (8) and the positioning plate (9), the movable column (5) is provided with a limiting plate (10) extending to the side, an avoidance hole (11) is formed on the adjustable wrench (6) for the movable column (5) to pass through, and the adjustable wrench (6) is located between the first connecting seat (221) and the limiting plate (10); and a side wall of the second connecting seat (101) is connected to a clamping hole (12) into which the movable column (5) can be inserted.

5. The handle folding structure of the wheelchair according to claim 4, wherein the movable column (5) comprises a screw (51) and a nut (52), and the screw (51) and the nut (52) are in threaded connection with each other; the positioning surface (8) is arranged on the screw (51); and the limiting plate (10) is arranged on the nut (52).

6. The handle folding structure of the wheelchair according to claim 5, wherein a clamping groove (13) is formed on a side surface of the adjustable wrench (6) facing away from the clamping hole (12), two abutting surfaces (14) facing the opposite directions are arranged on a side surface of the limiting plate (10), the abutting surfaces (14) are tightly adhered to two opposite inner walls in the clamping groove (13), and the nut (52) is fixed in a circumferential direction.

* * * * *